US010329763B2

(12) United States Patent
McCloud et al.

(10) Patent No.: US 10,329,763 B2
(45) Date of Patent: Jun. 25, 2019

(54) COMPOSITE FLOOR STRUCTURE AND METHOD OF MAKING THE SAME

(71) Applicant: Wabash National, L.P., Lafayette, IN (US)

(72) Inventors: Travis S. McCloud, Cadiz, KY (US); Scott A. Storz, Lafayette, IN (US); Andrzej Wylezinski, Lafayette, IN (US); Ronnal P. Reichard, Melbourne, FL (US); Scott M. Lewit, Indialantic, FL (US)

(73) Assignee: Wabash National, L.P., Lafayette, IN (US)

( * ) Notice: Subject to any disclaimer, the term of this patent is extended or adjusted under 35 U.S.C. 154(b) by 157 days.

(21) Appl. No.: 15/439,662

(22) Filed: Feb. 22, 2017

(65) Prior Publication Data
US 2017/0241134 A1 Aug. 24, 2017

Related U.S. Application Data

(60) Provisional application No. 62/299,215, filed on Feb. 24, 2016.

(51) Int. Cl.
*E04F 15/22* (2006.01)
*E04B 5/02* (2006.01)
(Continued)

(52) U.S. Cl.
CPC .............. *E04B 5/026* (2013.01); *B60P 1/283* (2013.01); *B62D 25/2054* (2013.01);
(Continued)

(58) Field of Classification Search
CPC . B60P 1/28; B60P 1/283; B62D 33/02; E02B 3/068; E04B 1/28; E04B 1/26;
(Continued)

(56) References Cited

U.S. PATENT DOCUMENTS 3,557,992 A    1/1971  Reeves
3,598,412 A *  8/1971  Lippert .............. A63F 7/2472
                                              273/129 R
(Continued)

FOREIGN PATENT DOCUMENTS

AU       713260      11/1999
CA      1329818       5/1994
(Continued)

OTHER PUBLICATIONS

Black, Sara, "Structural adhesives, Part I: Industrial," CompositesWorld, posted Apr. 11, 2016, 7 pages.
(Continued)

*Primary Examiner* — Chi Q Nguyen
(74) *Attorney, Agent, or Firm* — Faegre Baker Daniels LLP

(57) ABSTRACT

A composite floor structure and method of making the same are disclosed. The composite floor structure may include a platform and a plurality of transverse beams. The composite floor structure may also include at least one longitudinal beam and a plurality of insert beams to accommodate the longitudinal beam. The composite floor structure may also include an underlayment between the plurality of transverse beams and the at least one longitudinal beam. Some or all of these components may be integrally molded together to form a fiber-reinforced polymer structure. The composite floor structure may be used for cargo vehicles and other applications.

17 Claims, 9 Drawing Sheets

(51) Int. Cl.
*B60P 1/28* (2006.01)
*B62D 33/02* (2006.01)
*E02B 3/06* (2006.01)
*E04B 1/28* (2006.01)
*B62D 25/20* (2006.01)
*B62D 29/04* (2006.01)

(52) U.S. Cl.
CPC ............ *B62D 29/04* (2013.01); *B62D 33/02* (2013.01); *E02B 3/068* (2013.01); *E04B 1/28* (2013.01); *E04F 15/225* (2013.01)

(58) Field of Classification Search
CPC .... E04B 2001/2616; E04B 1/30; E04B 5/026; E04F 15/22; E04F 15/12
USPC ............... 52/403.1, 591.4, 583.1, 588.1; 296/184.1, 204, 203.01
See application file for complete search history.

(56) References Cited

U.S. PATENT DOCUMENTS

| | | | |
|---|---|---|---|
| 3,637,252 | A | 1/1972 | Metsker |
| 3,857,752 | A * | 12/1974 | McCoy ............... E04B 1/34846 428/74 |
| 4,418,507 | A | 12/1983 | Roberts et al. |
| 4,685,720 | A | 8/1987 | Oren |
| 4,758,299 | A | 7/1988 | Burke |
| 4,976,490 | A | 12/1990 | Gentle |
| 5,143,418 | A * | 9/1992 | Fouquet ................. B32B 21/13 105/422 |
| 5,403,063 | A | 4/1995 | Sjostedt et al. |
| 5,429,066 | A | 7/1995 | Lewit et al. |
| 5,501,504 | A * | 3/1996 | Kunz .................... B62D 21/02 280/783 |
| 5,507,405 | A | 4/1996 | Thomas |
| 5,562,981 | A | 10/1996 | Ehrlich |
| 5,664,518 | A | 9/1997 | Lewit et al. |
| 5,700,118 | A | 12/1997 | Bennett |
| 5,765,639 | A | 6/1998 | Muth |
| 5,772,276 | A | 6/1998 | Fetz et al. |
| 5,800,749 | A | 9/1998 | Lewit et al. |
| 5,802,984 | A | 9/1998 | Thoman |
| 5,830,308 | A | 11/1998 | Reichard |
| 5,860,668 | A | 1/1999 | Hull et al. |
| 5,860,693 | A | 1/1999 | Ehrlich |
| 5,890,435 | A | 4/1999 | Thoman |
| 5,897,818 | A | 4/1999 | Lewit et al. |
| 5,908,591 | A | 6/1999 | Lewit et al. |
| 5,916,093 | A | 6/1999 | Fecko |
| 5,979,684 | A | 11/1999 | Ohnishi |
| 5,992,117 | A | 11/1999 | Schmidt |
| 6,004,492 | A | 12/1999 | Lewit et al. |
| 6,013,213 | A | 1/2000 | Lewit et al. |
| 6,076,693 | A | 6/2000 | Reiter |
| 6,082,810 | A | 7/2000 | Bennett |
| 6,092,472 | A | 7/2000 | Thoman |
| 6,199,939 | B1 | 3/2001 | Ehrlich |
| 6,206,669 | B1 | 3/2001 | Lewit et al. |
| 6,220,651 | B1 | 4/2001 | Ehrlich |
| 6,227,125 | B1 | 5/2001 | Schroeder |
| 6,247,747 | B1 | 6/2001 | Kawanomoto |
| 6,283,538 | B1 * | 9/2001 | Reitnouer .......... B62D 25/2054 280/795 |
| 6,318,794 | B1 | 11/2001 | Berube |
| 6,349,988 | B1 | 2/2002 | Foster |
| 6,374,546 | B1 | 4/2002 | Fecko |
| 6,496,190 | B1 | 12/2002 | Driemeyer et al. |
| 6,497,190 | B1 | 12/2002 | Lewit |
| 6,497,932 | B1 * | 12/2002 | Munch ................... B08B 17/06 206/725 |
| 6,502,894 | B1 * | 1/2003 | Ingram .................... B60P 3/36 280/789 |
| 6,505,883 | B1 | 1/2003 | Ehrlich |
| 6,543,469 | B2 | 4/2003 | Lewit et al. |
| 6,615,741 | B2 | 9/2003 | Fecko |
| 6,626,622 | B2 | 9/2003 | Zubko |
| 6,659,020 | B1 * | 12/2003 | Ball .................... B29C 47/0038 108/57.28 |
| 6,688,835 | B1 | 2/2004 | Buher |
| 6,723,273 | B2 | 4/2004 | Johnson et al. |
| 6,740,381 | B2 | 5/2004 | Day et al. |
| 6,745,470 | B2 | 6/2004 | Foster et al. |
| 6,755,998 | B1 | 6/2004 | Reichard et al. |
| 6,761,840 | B2 | 7/2004 | Fecko |
| 6,824,341 | B2 | 11/2004 | Ehrlich |
| 6,843,525 | B2 | 1/2005 | Preisler |
| 6,854,791 | B1 | 2/2005 | Jaggi |
| 6,863,339 | B2 | 3/2005 | Bohm |
| 6,869,561 | B2 | 3/2005 | Johnson et al. |
| 6,877,940 | B2 | 4/2005 | Nelson |
| 6,893,075 | B2 | 5/2005 | Fenton et al. |
| 6,911,252 | B2 | 6/2005 | Lewit et al. |
| 6,986,546 | B2 | 1/2006 | Ehrlich |
| 7,000,978 | B1 | 2/2006 | Messano |
| 7,025,166 | B2 | 4/2006 | Thomas |
| 7,025,408 | B2 | 4/2006 | Jones et al. |
| 7,069,702 | B2 | 7/2006 | Ehrlich |
| 7,134,820 | B2 | 11/2006 | Ehrlich |
| 7,182,396 | B2 | 2/2007 | Taylor |
| 7,219,952 | B2 | 5/2007 | Taylor |
| 7,264,305 | B2 | 9/2007 | Kuriakose |
| 7,353,960 | B2 | 4/2008 | Seiter |
| 7,407,216 | B2 | 8/2008 | Taylor |
| 7,434,520 | B2 | 10/2008 | Zupancich |
| 7,451,995 | B2 | 11/2008 | Bloodworth et al. |
| 7,461,888 | B2 | 12/2008 | Brown |
| 7,517,005 | B2 | 4/2009 | Kuriakose |
| 7,575,264 | B1 | 8/2009 | Solomon |
| 7,578,534 | B2 | 8/2009 | Weariful, III |
| 7,578,541 | B2 | 8/2009 | Layfield |
| 7,587,984 | B2 | 9/2009 | Zupancich |
| 7,588,286 | B2 | 9/2009 | Lewallen |
| 7,594,474 | B2 | 9/2009 | Zupancich |
| 7,608,313 | B2 | 10/2009 | Solomon |
| 7,621,589 | B1 | 11/2009 | Gerome |
| 7,704,026 | B2 | 4/2010 | Roush |
| 7,722,112 | B2 | 5/2010 | Ehrlich |
| 7,748,172 | B2 | 7/2010 | Zupancich |
| 7,762,618 | B2 | 7/2010 | Lewallen |
| 7,790,076 | B2 | 9/2010 | Seiter |
| 7,829,165 | B2 | 11/2010 | Grandominico et al. |
| 7,887,120 | B2 | 2/2011 | Bovine |
| 7,901,537 | B2 | 3/2011 | Jones |
| 7,905,072 | B2 | 3/2011 | Verhaeghe |
| 7,914,034 | B2 | 3/2011 | Roush |
| 7,931,328 | B2 | 4/2011 | Lewallen |
| 8,016,322 | B2 | 9/2011 | Keehan |
| 8,056,960 | B2 | 11/2011 | Brown |
| 8,096,728 | B2 * | 1/2012 | Stasiewich ................ E01C 9/08 404/41 |
| 8,186,747 | B2 | 5/2012 | Bloodworth et al. |
| 8,263,217 | B2 | 9/2012 | Verhaeghe |
| 8,342,588 | B2 | 1/2013 | Skaradzinski |
| 8,448,989 | B2 | 5/2013 | Verhaeghe |
| 8,474,871 | B1 * | 7/2013 | Ludwick ................ B62D 21/20 280/423.1 |
| 8,696,048 | B2 | 4/2014 | Griffin et al. |
| 8,757,704 | B2 | 6/2014 | Zhao et al. |
| 8,814,255 | B2 | 8/2014 | Yamaji et al. |
| 8,876,193 | B2 | 11/2014 | Kunkel et al. |
| 8,950,144 | B2 | 2/2015 | Padmanabhan |
| 9,051,014 | B2 | 6/2015 | Lookebill et al. |
| 9,138,943 | B2 | 9/2015 | Weinberg |
| 9,138,974 | B2 | 9/2015 | Weinberg |
| 9,138,975 | B2 | 9/2015 | Weinberg |
| 9,174,656 | B2 | 11/2015 | Heitmeyer |
| 9,199,440 | B2 | 12/2015 | Weinberg |
| 9,205,635 | B2 | 12/2015 | Weinberg |
| 9,260,117 | B2 | 2/2016 | Vande Sands |
| 9,317,468 | B2 | 4/2016 | Liebald et al. |
| 9,339,987 | B2 | 5/2016 | Weinberg |
| 9,409,607 | B2 | 8/2016 | Osten |

(56) References Cited

U.S. PATENT DOCUMENTS

| | | |
|---|---|---|
| 9,434,421 B1 | 9/2016 | Lu |
| 9,499,203 B1 | 11/2016 | Finley |
| 9,566,769 B2 | 2/2017 | Weinberg |
| 9,604,677 B2 | 3/2017 | McKinney |
| 9,650,003 B2 | 5/2017 | Owens |
| 9,708,009 B2 | 7/2017 | Vance |
| 9,738,050 B2 | 8/2017 | Lee |
| 9,744,753 B2 | 8/2017 | Sheffield |
| 9,815,501 B2 | 11/2017 | McCormack |
| 9,827,750 B2 | 11/2017 | Lookebill |
| 9,828,164 B2 | 11/2017 | Denson |
| 9,878,744 B2 | 1/2018 | Lu |
| 9,884,660 B2 | 2/2018 | Fenton |
| 9,884,661 B2 | 2/2018 | Fenton |
| 9,889,637 B2 | 2/2018 | Weinberg |
| 2001/0011832 A1 | 8/2001 | Ehrlich |
| 2001/0015222 A1* | 8/2001 | Lewit ............... B29C 44/1209 137/2 |
| 2005/0194381 A1 | 9/2005 | Zupancich |
| 2005/0241253 A1 | 11/2005 | Song et al. |
| 2006/0065152 A1 | 3/2006 | Heitmeyer |
| 2006/0087152 A1* | 4/2006 | Kuriakose ........ B62D 25/2054 296/184.1 |
| 2006/0108361 A1 | 5/2006 | Seiter |
| 2006/0121244 A1 | 6/2006 | Godwin |
| 2006/0123725 A1 | 6/2006 | Godwin |
| 2006/0124008 A1 | 6/2006 | Kessenich et al. |
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2007/0119850 A1 | 5/2007 | Seiter |
| 2007/0132278 A1 | 6/2007 | Lester et al. |
| 2007/0160793 A1 | 7/2007 | Cageao |
| 2007/0194602 A1 | 8/2007 | Ehrlich |
| 2007/0216197 A1 | 9/2007 | Wuerfel, III |
| 2007/0250025 A1 | 10/2007 | Sams |
| 2008/0290057 A1 | 11/2008 | Zupancich |
| 2009/0126600 A1 | 5/2009 | Zupancich |
| 2009/0278386 A1 | 11/2009 | Ehrlich |
| 2010/0101876 A1 | 4/2010 | Misencik |
| 2010/0109309 A1 | 5/2010 | Kootstra |
| 2011/0095574 A1 | 4/2011 | Brown |
| 2011/0204611 A1 | 8/2011 | Ziegler |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Presiler |
| 2015/0158532 A1 | 6/2015 | Ayuzawa |
| 2015/0203160 A1 | 7/2015 | Peterson et al. |
| 2017/0057561 A1 | 3/2017 | Fenton |
| 2017/0166263 A1 | 6/2017 | McKinney |
| 2017/0210317 A1 | 7/2017 | Owens |
| 2017/0240216 A1 | 8/2017 | Bauer |
| 2017/0240217 A1 | 8/2017 | Storz |
| 2017/0241134 A1 | 8/2017 | McCloud |
| 2017/0247063 A1 | 8/2017 | Banerjee |
| 2017/0282499 A1 | 10/2017 | LaRocco |
| 2017/0298581 A1* | 10/2017 | Lewit ................ E01D 19/125 |
| 2017/0334489 A1 | 11/2017 | Shin |
| 2018/0037151 A1 | 2/2018 | Bauer et al. |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2763094 | 9/2009 |
| CA | 2788047 | 8/2011 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |
| JP | 2007-245467 A | 9/2007 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor-trouble shooter-enthusiast!" presented at Florida Institute of Technology at least as early as 1999, 37 pages.

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

Eric Green Associates.com, "Composite Rudders Take Shape for U.S. Navy" available online at http://www.ericgreeneassociates.com/images/Composite_Twisted_Rudder.pdf, accessed as early as Jul. 13, 2014, 7 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Scott Bader Group Companies, Crystic, "Composites Handbook", 100 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

(56) References Cited

OTHER PUBLICATIONS

Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.
Johnson Truck Bodies, Blizzard Series brochure, accessed as early as Aug. 1, 2014, 8 pages.
International Trucking Shows, "True Composites Platform Highlight of International Trucking Show," Aug. 1992, 1 page.
Composite Twisted Rudder, TCC Meeting 2008, handout, 32 pages.
Composite Marine Control Surface, installed on USS Pioneer (MCM 9), May 1997, 13 pages.
Trailer/Body Builders, "More Emphasis on Less Weight," available at http://trailer-bodybuilders.com/trailers/more-emphasis-less-weight, May 1, 2008, 5 pages.
European Search Report dated Feb. 8, 2018 issued in European Patent Application No. 15873441.8.

* cited by examiner

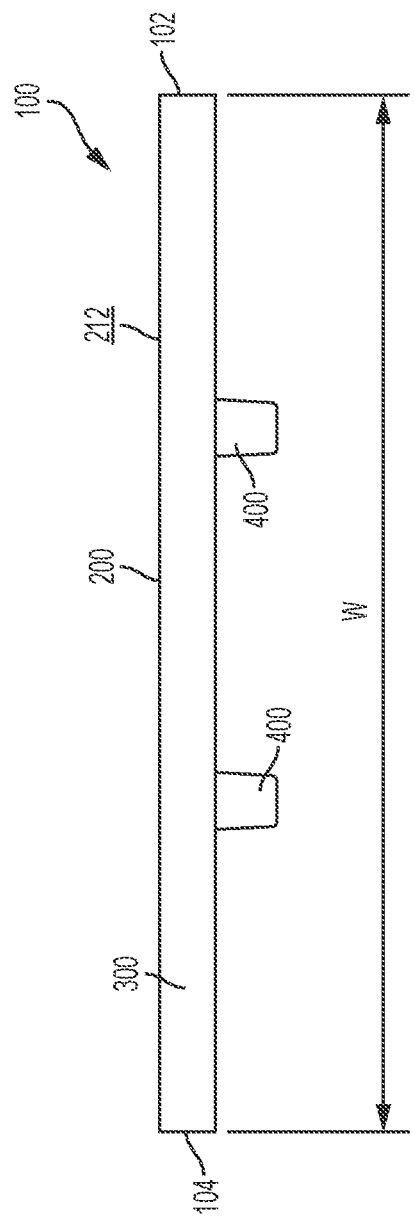
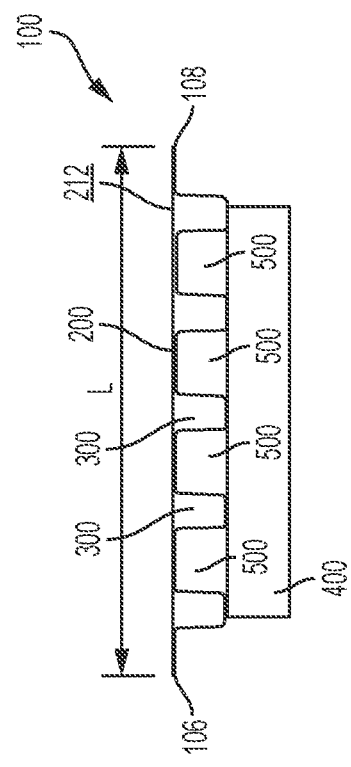

COMPOSITE FLOOR STRUCTURE AND METHOD OF MAKING THE SAME

CROSS REFERENCE TO RELATED APPLICATION

This application claims priority to U.S. Provisional Patent Application Ser. No. 62/299,215, filed Feb. 24, 2016, the disclosure of which is hereby expressly incorporated by reference herein in its entirety.

FIELD OF THE DISCLOSURE

The present disclosure relates generally to floor structures and methods of making the same. More particularly, the present disclosure relates to floor structures made of composite materials for use in cargo vehicles and other applications and methods of making the same.

BACKGROUND OF THE DISCLOSURE

Cargo vehicles are used in the transportation industry for transporting many different types of cargo. Certain cargo vehicles may be refrigerated and insulated to transport temperature-sensitive cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example.

SUMMARY OF THE DISCLOSURE

A composite floor structure and method of making the same are disclosed. The composite floor structure may include a platform and a plurality of transverse beams. The composite floor structure may also include at least one longitudinal beam and a plurality of insert beams to accommodate the longitudinal beam. The composite floor structure may also include an underlayment between the plurality of transverse beams and the at least one longitudinal beam. Some or all of these components may be integrally molded together to form a fiber-reinforced polymer structure. The composite floor structure may be used for cargo vehicles and other applications.

According to an exemplary embodiment of the present disclosure, a composite floor structure is disclosed including a platform having an upper floor surface, and a plurality of transverse beams integrally molded to the platform, wherein each transverse beam has a tapered side wall to facilitate mold extraction.

According to another exemplary embodiment of the present disclosure, a composite floor structure is disclosed including a platform having an upper floor surface, a plurality of transverse beams coupled beneath the platform, at least one longitudinal beam extending across the plurality of transverse beams, and a plurality of insert beams positioned between adjacent transverse beams to provide a continuous surface for the at least one longitudinal beam.

According to yet another exemplary embodiment of the present disclosure, a composite floor structure is disclosed including a platform having an upper floor surface, a plurality of transverse beams coupled beneath the platform, at least one longitudinal beam extending across the plurality of transverse beams, and an underlayment sandwiched between the plurality of transverse beams and the at least one longitudinal beam.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 2 is a rear end elevational view of the composite floor structure of FIG. 1;

FIG. 3 is a left side elevational view of the composite floor structure of FIG. 1;

Figure 1:
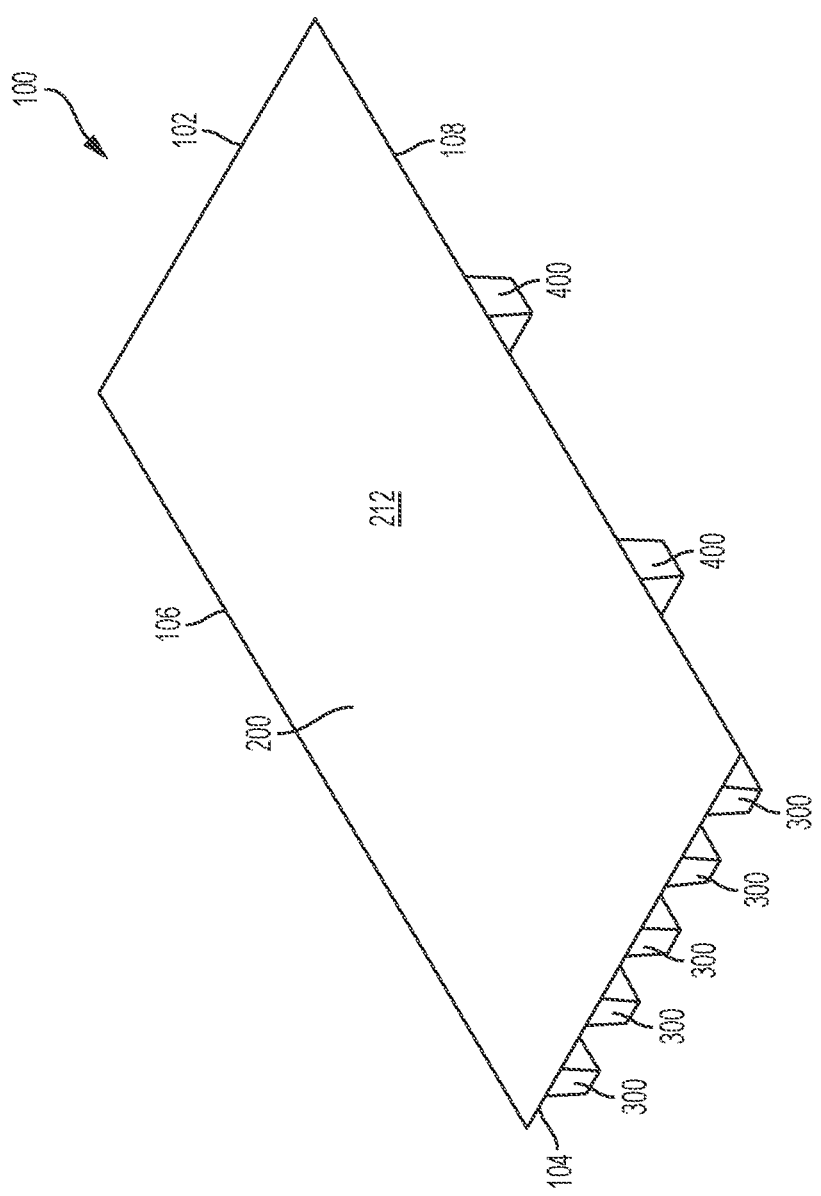
FIG. 1 is a top perspective view of an exemplary composite floor structure of the present disclosure, the composite floor structure including a platform, a plurality of transverse beams, and a plurality of longitudinal beams.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Floor Structure

Referring initially to FIGS. 1-4, a composite floor structure 100 is shown. In certain embodiments, the composite floor structure 100 may be used in cargo vehicles for supporting and transporting cargo, including semi trailers (e.g., refrigerated semi trailers, dry freight semi trailers, flatbed semi trailers), other trailers, box trucks or vans, and the like. In other embodiments, the composite floor structure 100 may be used to construct dump trucks or dump trailers, boat docks, mezzanines, storage units, or temporary shelters, for example. Accordingly, those skilled in the art will appreciate that the present invention may be implemented in a number of different applications and embodiments and is not specifically limited in its application to the particular embodiments depicted herein.

Figure 4:
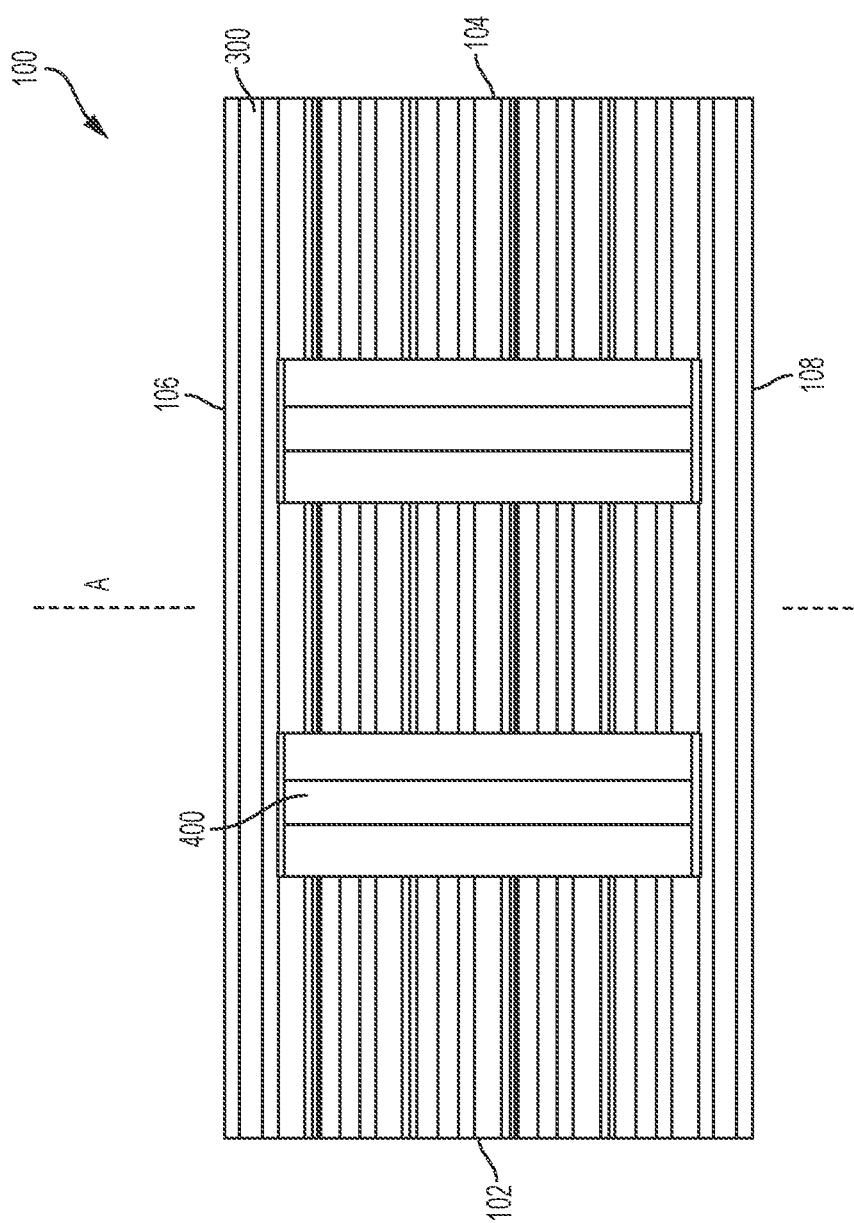
FIG. 4 is a bottom plan view of the composite floor structure of FIG. 1.

The illustrative composite floor structure 100 is generally rectangular in shape, although this shape may vary. As shown in FIG. 2, the composite floor structure 100 has a width W between a right side 102 and a left side 104. As shown in FIG. 3, the composite floor structure 100 has a length L between a front end 106 and a rear end 108. The length L and the width W may vary depending on the needs of the particular application. As shown in FIG. 4, the composite floor structure 100 also has a longitudinal axis A that extends through the front end 106 and the rear end 108.

Figure 10:
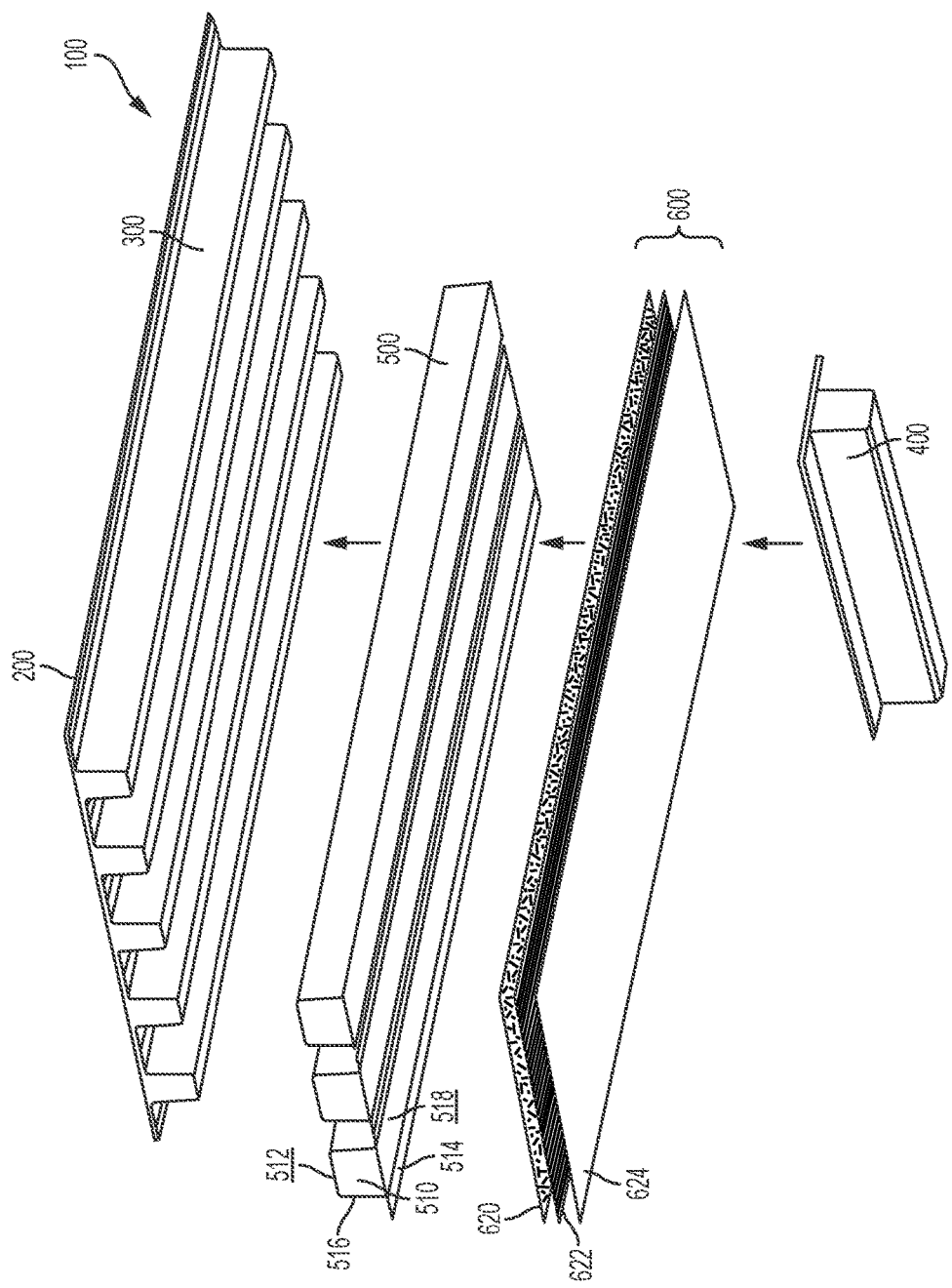
FIG. 10 is another bottom exploded perspective view of the composite floor structure of FIG. 1, showing a plurality of alternative insert beams and an underlayment.

The illustrative composite floor structure 100 includes a deck or platform 200, a plurality of transverse beams 300 extending from the right side 102 to the left side 104 beneath the platform 200, and a plurality of longitudinal beams 400 extending from the front end 106 to the rear end 108 beneath the transverse beams 300. As shown in FIG. 4, the transverse beams 300 extend perpendicular to the longitudinal axis A, and the longitudinal beams 400 extend parallel to the longitudinal axis A. As shown in FIG. 3, the composite floor structure 100 may also include insert beams 500 extending between adjacent transverse beams 300. As shown in FIG. 10, the composite floor structure 100 may also include an underlayment 600 located below transverse beams 300 and insert beams 500 and above longitudinal beams 400 and parallel to platform 200.

In the illustrated embodiment of FIGS. 1-4, the composite floor structure 100 includes five transverse beams 300 and two longitudinal beams 400, but the number of beams 300, 400 may vary depending on the needs of the particular application. Also, the size of each beam 300, 400 and the spacing between adjacent beams 300, 400 may vary depending on the needs of the particular application. For example, a relatively large number of closely-spaced beams 300, 400 may be used for high-weight/high-strength applications, whereas a relatively small number of spaced-apart beams 300, 400 may be used for low-weight/low-strength applications.

2. Composite Materials with Reinforcing Layers and/or Structural Preforms

The composite floor structure 100 may be constructed, at least in part, of composite materials. For example, the platform 200, the transverse beams 300, the longitudinal beams 400, the insert beams 500, and/or the underlayment 600 of the composite floor structure 100 may be constructed of composite materials. As such, the platform 200, the transverse beams 300, the longitudinal beams 400, the insert beams 500, and/or the underlayment 600 of the composite floor structure 100 may be referred to herein as composite structures. These composite structures may lack internal metal components. Also, each composite structure may be a single, unitary component, which may be formed from a plurality of layers permanently coupled together. Exemplary composite materials for use in the composite floor structure 100 include fiber-reinforced plastics (FRP), for example carbon-fiber-reinforced plastics (CRP).

Each composite structure may contain one or more reinforcing layers that contains reinforcing fibers and is capable of being impregnated and/or coated with a resin, as discussed in Section 8 below. Suitable fibers include carbon fibers, glass fibers, cellulose, or polymers, for example. The fibers may present in fabric form, which may be matt, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala.

According to an exemplary embodiment of the present disclosure, a plurality of different reinforcing materials may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

Also, certain composite structures may contain a structural support or preform. The preform may have a structural core that has been covered with an outer fabric layer or skin. The core may be extruded, pultruded, or otherwise formed into a desired shape and cut to a desired length. In an exemplary embodiment, the core is a polyurethane foam material or another foam material, and the outer skin is a spun bond polyester material. Exemplary preforms include PRISMA® preforms provided by Compsys, Inc. of Melbourne, Fla. Advantageously, in addition to its structural effect, the foam core may have an insulating effect in certain applications, including refrigerated trucking applications. Both the core and the outer skin may be selected to accommodate the needs of the particular application. For example, in areas of the preform requiring more strength and/or insulation, a low-density foam may be replaced with a high-density foam or a hard plastic block.

3. Platform

Figure 5:
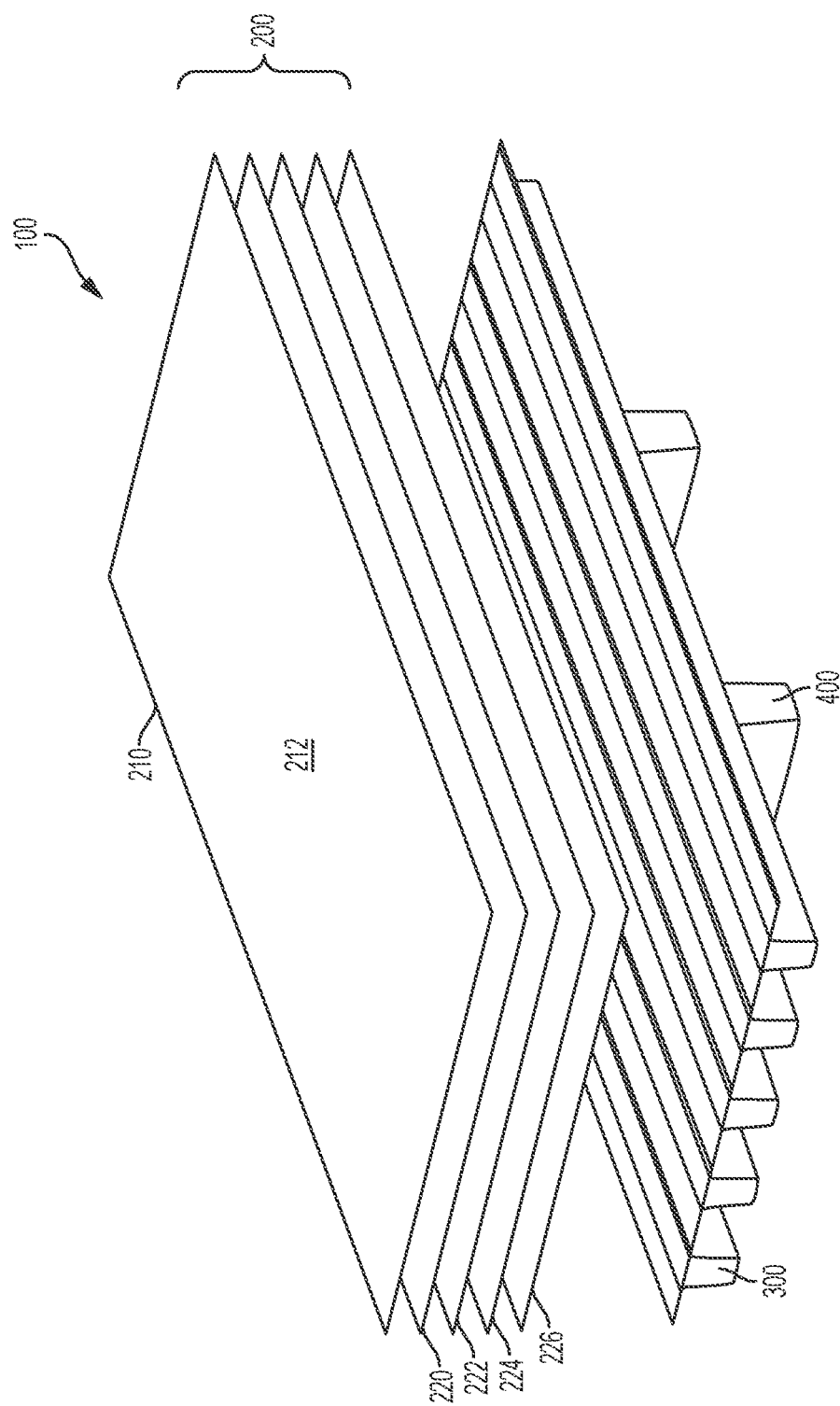
FIG. 5 is an exploded perspective view of the platform of FIG. 1.

Referring next to FIG. 5, the platform 200 may be constructed from a plurality of layers permanently coupled or laminated together. From top to bottom in FIG. 5, the illustrative platform 200 includes a top layer 210 and four reinforcing layers 220, 222, 224, 226, although the number, types, and locations of these layers may vary depending on the needs of the particular application.

The top layer 210 of the platform 200 defines a flat upper surface 212 for supporting cargo or other objects. According to an exemplary embodiment of the present disclosure, the top layer 210 is a polymer resin or gelcoat layer. In other embodiments, the top layer 210 is a metal (e.g., aluminum, stainless steel), polymer, wood, or pultrusion layer. The top layer 210 may be integrally molded with or otherwise applied to the reinforcing layers 220, 222, 224, 226, such as using structural adhesive, mechanical fasteners (e.g., bolts, rivets), or a spray coating process.

In one exemplary embodiment, the top layer 210 is a metal (e.g., aluminum, stainless steel) layer or includes a metal upper surface 212. The upper surface 212 of the metal may be completely flat or textured (e.g., dimpled or ridged) to provide a slip-resistant surface. The top layer 210 may also define channels (i.e., ducts), and such channels may extend through the interior of top layer 210 or across a surface (e.g., upper surface 212) of top layer 210. The top layer 210 may be extruded or otherwise formed into a desired width and cut to a desired length. An exemplary method for attaching top layer 210 during the molding process using one or more co-cure adhesives is disclosed in a co-filed application titled "Composites Formed from Co-Cure Adhesive," the disclosure of which is hereby expressly incorporated by reference herein in its entirety.

To accommodate different loads on the platform 200, each reinforcing layer 220, 222, 224, 226 may be unique to provide a combination of different fiber types, sizes, and/or orientations across the platform 200. Additional disclosure regarding the reinforcing layers 220, 222, 224, 226 is set forth in Section 2 above.

4. Transverse Beams

Figure 6:
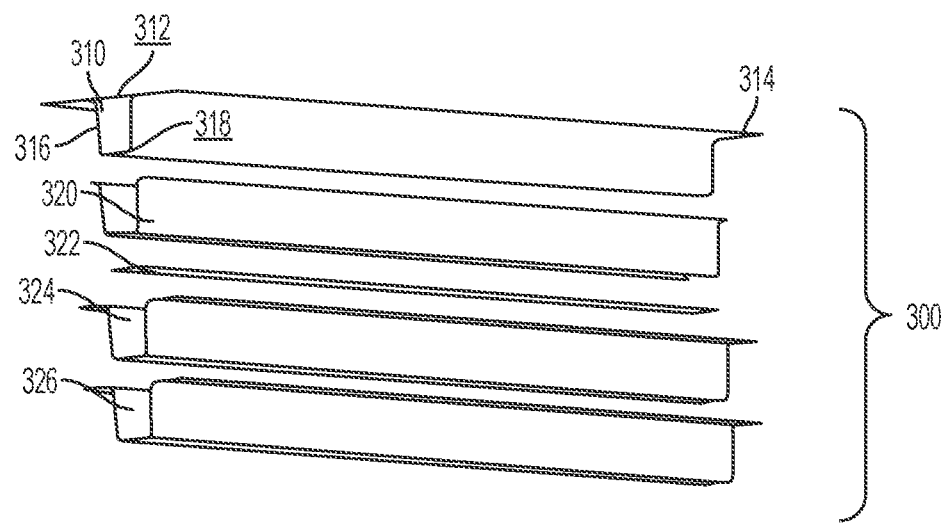
FIG. 6 is an exploded perspective view of the transverse beam of FIG. 1.

Referring next to FIG. 6, each transverse beam 300 may be constructed from a plurality of layers permanently coupled or laminated together. The transverse beams 300 may provide stiffness and resistance to bending and deflection in the transverse direction. From top to bottom in FIG. 6, the illustrative transverse beam 300 includes a preform 310 and four reinforcing layers 320, 322, 324, 326, although the number, types, and locations of these layers may vary depending on the needs of the particular application.

The illustrative preform 310 of FIG. 6 has an upper surface 312 with two flanges 314 configured to support the platform 200, side walls 316, and a lower surface 318 configured to support the longitudinal beams 400. From the upper surface 312 to the lower surface 318, the side walls 316 have a slight inward taper or draft such that the preform 310 narrows in width and is generally trapezoidal in cross-section. This trapezoidal shape may facilitate mold extraction, as discussed in Section 8 below. Additional disclosure regarding the preform 310 is set forth in Section 2 above.

As shown in FIG. 6, three of the reinforcing layers 320, 324, 326 are sized and shaped to wrap around the side walls 316 and the lower surface 318 of the preform 310, whereas the reinforcing layer 322 is a thin strip that is sized for selective receipt beneath the lower surface 318 of the preform 310. To accommodate different loads on the transverse beams 300, each reinforcing layer 320, 322, 324, 326 may be unique to provide a combination of different fiber types, sizes, and/or orientations across the beam 300. Additional disclosure regarding the reinforcing layers 320, 322, 324, 326 is set forth in Section 2 above.

5. Longitudinal Beams

Figure 7:
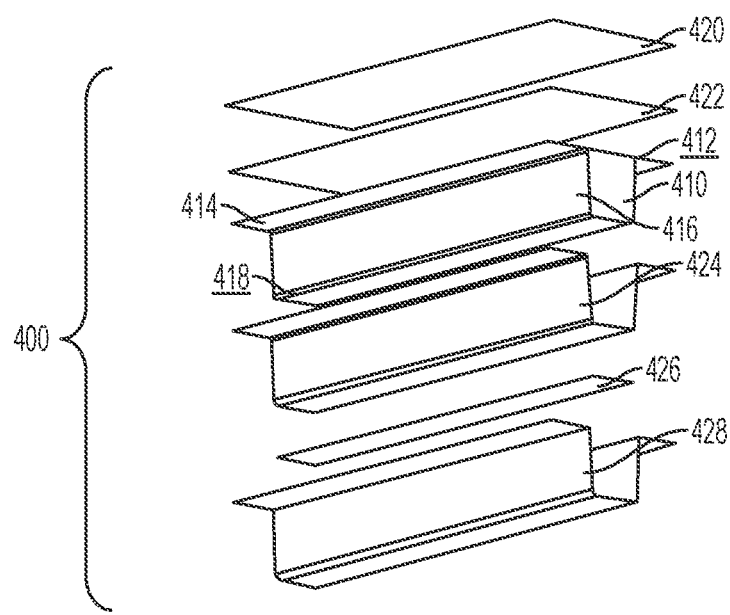
FIG. 7 is an exploded perspective view of the longitudinal beam of FIG. 1.

Referring next to FIG. 7, each longitudinal beam 400 may be constructed from a plurality of layers permanently coupled or laminated together. The longitudinal beams 400 may provide stiffness and resistance to bending and deflection in the longitudinal direction and may help couple adjacent transverse beams 300 together. Also, the longitudinal beams 400 may serve as a connection point for another structure, such as a vehicle chassis, a wheel assembly, or a landing gear in trucking applications. From top to bottom in FIG. 7, the illustrative longitudinal beam 400 includes two upper reinforcing layers 420, 422, a preform 410, and three lower reinforcing layers 424, 426, 428, although the number, types, and locations of these layers may vary depending on the needs of the particular application.

The illustrative preform 410 of FIG. 7 has an upper surface 412 with two flanges 414 configured to support the transverse beams 300 located above longitudinal beams 400, side walls 416, and a lower surface 418. From the upper surface 412 to the lower surface 418, the side walls 416 have a slight inward taper or draft such that the preform 410 narrows in width and is generally trapezoidal in cross-section. This trapezoidal shape may facilitate mold extraction, as discussed in Section 8 below. Additional disclosure regarding the preform 410 is set forth in Section 2 above.

As shown in FIG. 7, the upper reinforcing layers 420, 422 are sized and shaped to extend across the upper surface 412 and flanges 414 of the preform 410. Two of the lower reinforcing layers 424, 428 are sized and shaped to wrap around the side walls 416 and the lower surface 418 of the preform 410, whereas the reinforcing layer 426 is a thin strip that is sized and shaped for selective receipt beneath the lower surface 418 of the preform 410. To accommodate different loads on the longitudinal beams 400, each reinforcing layer 420, 422, 424, 426, 428 may be unique to provide a combination of different fiber types, sizes, and/or orientations across the longitudinal beam 400. Additional disclosure regarding the reinforcing layers 420, 422, 424, 426, 428 is set forth in Section 2 above.

In other embodiments, the longitudinal beam 400 may be a non-composite structure, such as a metal (e.g., aluminum) beam or wood beam, for example. In these embodiments, the longitudinal beam 400 may be coupled to the rest of the composite floor structure 100 using structural adhesive and/or mechanical fasteners (e.g., bolts, rivets), for example.

6. Insert Beams

Figure 8:
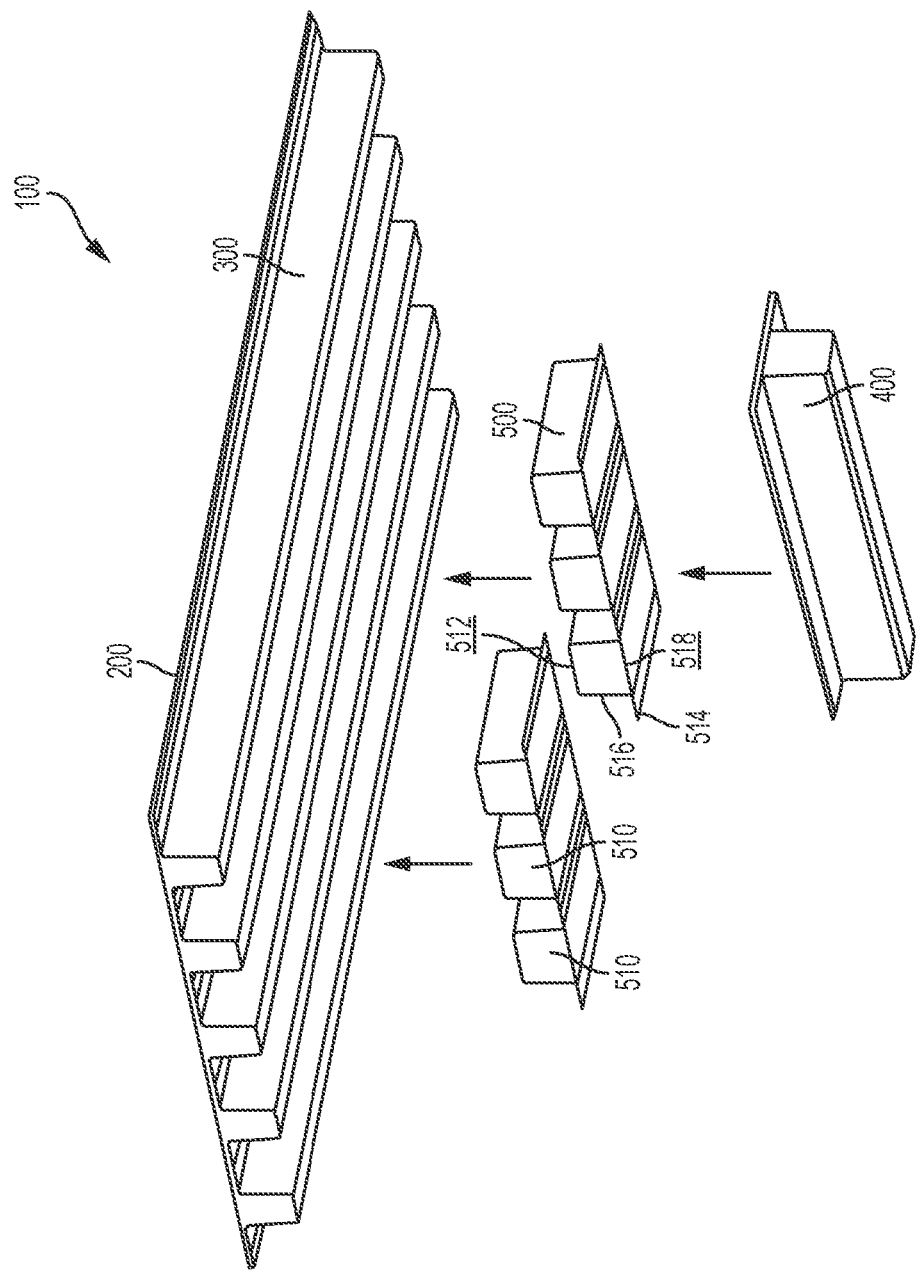
FIG. 8 is a bottom exploded perspective view of the composite floor structure of FIG. 1, also showing a plurality of insert beams.
Figure 9:
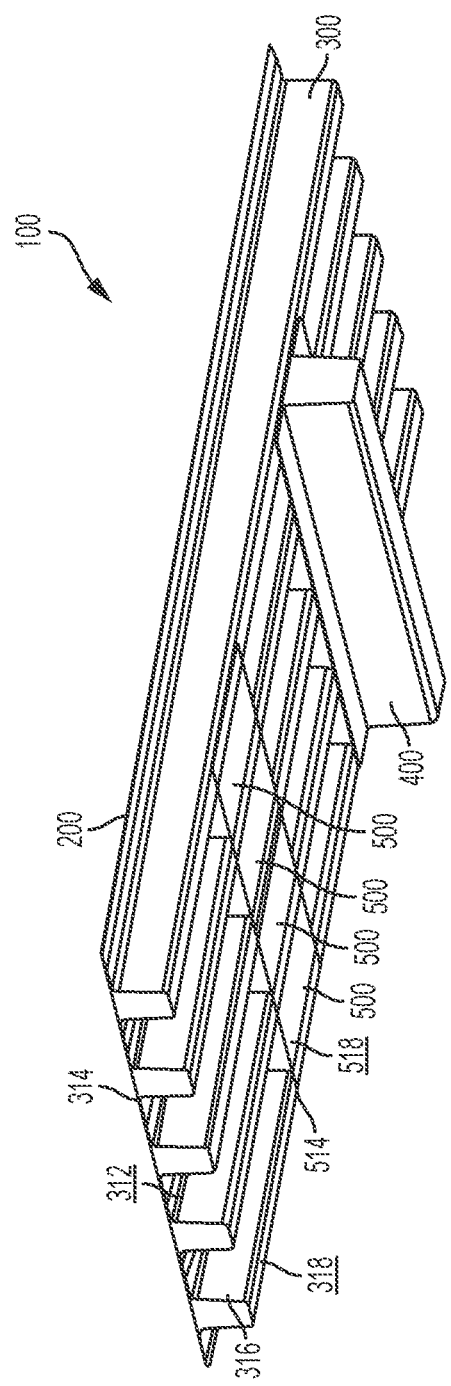
FIG. 9 is an assembled perspective view of FIG. 8.

Referring next to FIGS. 8-10, insert beams 500 may be sized for receipt between adjacent transverse beams 300 to help support longitudinal beams 400. Each insert beam 500 may be constructed of a preform 510, as discussed in Section 2 above, with or without the need for additional reinforcing layers.

As shown in FIG. 8, each insert beam 500 has an upper surface 512, side walls 516, and a lower surface 518 with two flanges 514. From the upper surface 512 to the lower surface 518, the side walls 516 have a slight outward taper or draft such that the insert beam 500 increases in width and is generally trapezoidal in cross-section.

When assembled, as shown in FIG. 9, the upper surface 512 of the insert beam 500 may generally align with the upper surfaces 312 of the adjacent transverse beams 300. The flanges 314 that extend from the adjacent transverse beams 300 may overlap the upper surface 512 of the insert beam 500 to provide a smooth and continuous surface for the platform 200. Similarly, the lower surface 518 of the insert beam 500 may generally align with the lower surfaces 318 of the adjacent transverse beams 300. The flanges 514 that extend from the insert beam 500 may overlap the lower surfaces 318 of the adjacent transverse beams 300 to provide a smooth and continuous surface for the underlayment 600 and/or the longitudinal beams 400. Furthermore, the tapered side walls 516 of the insert beam 500 may have a matching fit with the tapered side walls 316 of the adjacent transverse beams 300.

The length of each insert beam 500 may vary depending on the needs of the particular application. In a first embodiment of FIGS. 8 and 9, the insert beams 500 are relatively short, corresponding only to the width of the longitudinal beam 400. This first embodiment may be used to minimize the weight and material cost of the floor structure 100. In a second embodiment of FIG. 10, by contrast, the insert beams 500 are relatively long, corresponding to the width of the entire floor structure 100 to fill spaces beyond the longitudinal beams 400. This second embodiment may be used to insulate the floor structure 100, such as in refrigerated trucking applications, and to provide a continuous surface for underlayment 600.

7. Underlayment

As shown in FIG. 10, underlayment 600 is located below transverse beams 300 and insert beams 500 and above longitudinal beams 400 in a sandwiched arrangement. Underlayment 600 is arranged parallel to platform 200. Underlayment 600 may be constructed from a plurality of reinforcing layers permanently coupled or laminated together. From top to bottom in FIG. 10, the illustrative underlayment 600 includes three reinforcing layers 620, 622, 624, although the number, types, and locations of these layers may vary depending on the needs of the particular application. When the illustrative composite floor structure 100 is assembled, the top reinforcing layer 620 is coupled to transverse beams 300 and insert beams 500, and the bottom reinforcing layer 624 is coupled to longitudinal beams 400. It is also within the scope of the present disclosure for underlayment 600 to include a single reinforcing layer (e.g., reinforcing layer 620). In this embodiment, the top surface of the reinforcing layer 620 would be coupled to transverse beams 300 and insert beams 500, and the bottom surface of reinforcing layer 620 would be coupled to longitudinal beams 400.

Underlayment 600 may experience high tensile stresses, such as when a fork truck drives over the composite floor structure 100. Underlayment 600 may be designed to accommodate the type of floor structure 100, its load rating, the allowed floor maximum deflection requirement, and other requirements. In embodiments where underlayment 600 contains a plurality of reinforcing layer 620, 622, 624, each reinforcing layer 620, 622, 624 may be unique to provide a combination of different fiber types, sizes, and/or orientations across the underlayment 600.

In one example, underlayment 600 includes a single reinforcing layer 620 constructed of a random-orientation chopped fiber fabric, specifically CSM. The CSM of reinforcing layer 620 may have a weight as low as about 1.5 ounce/yard and as high as about 6.0 ounce/yard$^2$.

In another example, underlayment 600 includes a single reinforcing layer 620 constructed of a continuous fiber fabric, specifically a 0° unidirectional fiberglass fabric. The 0° direction of the fabric may be oriented in the lateral direction of the composite floor structure 100 (i.e., perpendicular to the longitudinal axis A of FIG. 4) for added strength in the lateral direction.

Additional disclosure regarding the one or more reinforcing layers 620, 622, 624 of underlayment 600 is set forth in Section 2 above.

8. Molding Process

The composite floor structure 100 may be formed by a molding process. An exemplary molding process involves placing the preforms (e.g., preforms 310, 410, 510) and the reinforcing layers (e.g., reinforcing layers 220, 222, 224, 226, 320, 322, 324, 326, 420, 422, 424, 426, 428, 620, 622, 624) together in a mold, wetting the materials with at least one resin and a catalyst to impregnate and/or coat the materials, and curing the materials to form a single, integral, laminated composite floor structure 100. In certain embodiments, the top layer 210 of the platform 200 may also be placed inside the mold and integrally molded with the composite floor structure 100, as discussed in Section 3 above. After curing, the trapezoidal shape of the preforms 310, 410, 510 may facilitate easy extraction from the mold, which may be an open mold or a closed mold.

The resin used to construct the composite floor structure 100 may be a typical resin, a co-cure resin containing a plurality of individual co-curing resins which may be selectively distributed throughout the composite floor structure 100 during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite floor structure 100 that will be susceptible to high stress may receive a resin with a relatively higher polyurethane content for strength, whereas other areas of the composite floor structure 100 that provide bulk and section modulus may receive a lower cost rigid, polyester-based resin, such as an isophthalic polyester resin.

When composite floor structure 100 is part of a cargo vehicle, for example, a similar method may be performed using similar materials to construct other elements of the cargo vehicle, such as the nose, sidewalls, and/or roof.

Additional information regarding the construction of the composite floor structure 100 is disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, and 6,543,469, and U.S. Patent Application Publication Nos. 2014/0262011 and 2014/0199551.

In another embodiment, individual pieces of the composite floor structure 100 may be molded and then coupled together using structural adhesive and/or mechanical fasteners (e.g., bolts, rivets), for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A composite floor structure comprising:
   a platform having an upper floor surface;
   a plurality of transverse beams integrally molded to the platform, wherein each transverse beam has a tapered side wall to facilitate mold extraction;
   at least one longitudinal beam extending perpendicular to the plurality of transverse beams; and
   an underlayment sandwiched between the plurality of transverse beams and the at least one longitudinal beam.

2. The composite floor structure of claim 1, wherein the composite floor structure comprises a fiber-reinforced plastic.

3. The composite floor structure of claim 1, wherein each transverse beam includes:
a preform;
a first reinforcing layer sized to wrap around the preform; and
a second reinforcing layer sized smaller than the first reinforcing layer for selective positioning beneath the preform.

4. The composite floor structure of claim 3, wherein the preform is constructed of foam.

5. The composite floor structure of claim 1, wherein each transverse beam includes an upper surface positioned adjacent to the platform and a lower surface, the transverse beam narrowing from the upper surface to the lower surface.

6. The composite floor structure of claim 1, wherein the platform includes at least one metallic layer and at least one fiber-reinforced plastic layer.

7. The composite floor structure of claim 1, wherein the at least one longitudinal beam has a tapered side wall to facilitate mold extraction.

8. A composite floor structure comprising:
a platform having an upper floor surface;
a plurality of transverse beams coupled beneath the platform;
at least one longitudinal beam extending across the plurality of transverse beams; and
a plurality of insert beams positioned between adjacent transverse beams to provide a continuous surface for the at least one longitudinal beam, wherein each transverse beam includes a preform and a plurality of additional reinforcing layers and each insert beam includes a preform without any additional reinforcing layers.

9. The composite floor structure of claim 8, wherein a length of each insert beam corresponds to a width of the at least one longitudinal beam.

10. The composite floor structure of claim 8, wherein a length of each insert beam corresponds to a width of the platform.

11. The composite floor structure of claim 8, wherein the composite floor structure comprises a fiber-reinforced plastic including:
a first reinforcement layer comprising chopped fibers; and
a second reinforcement layer positioned immediately adjacent to the first reinforcement layer and comprising continuous fibers.

12. A composite floor structure comprising:
a platform having an upper floor surface;
a plurality of transverse beams coupled beneath the platform;
at least one longitudinal beam extending across the plurality of transverse beams;
a plurality of insert beams positioned between adjacent transverse beams to provide a continuous surface for the at least one longitudinal beam; and
an underlayment positioned beneath the plurality of transverse beams and the plurality of insert beams and above the at least one longitudinal beam.

13. A composite floor structure comprising:
a platform having an upper floor surface;
a plurality of transverse beams coupled beneath the platform;
at least one longitudinal beam extending across the plurality of transverse beams; and
an underlayment sandwiched between the plurality of transverse beams and the at least one longitudinal beam, wherein the platform is arranged parallel to the underlayment.

14. The composite floor structure of claim 13, wherein the underlayment is a fiber-reinforced plastic.

15. The composite floor structure of claim 14, wherein the fiber-reinforced plastic of the underlayment comprises a continuous fiber fabric having a plurality fibers oriented parallel to the plurality of transverse beams.

16. The composite floor structure of claim 13, wherein the platform includes at least one metallic layer and at least one fiber-reinforced plastic layer.

17. A composite floor structure comprising:
a platform having an upper floor surface;
a plurality of transverse beams coupled beneath the platform;
at least one longitudinal beam extending across the plurality of transverse beams;
an underlayment sandwiched between the plurality of transverse beams and the at least one longitudinal beam; and
a plurality of insert beams positioned between adjacent transverse beams to provide a continuous surface for the underlayment.

* * * * *